Nov. 8, 1955 D. N. GOLDBERG 2,723,016
BRAKE OR CLUTCH STRUCTURE
Filed Aug. 20, 1954 5 Sheets-Sheet 1

INVENTOR
David N. Goldberg
BY Burns, Doane, Benedict & Irons
ATTORNEYS

Nov. 8, 1955　　D. N. GOLDBERG　　2,723,016
BRAKE OR CLUTCH STRUCTURE
Filed Aug. 20, 1954　　5 Sheets-Sheet 2
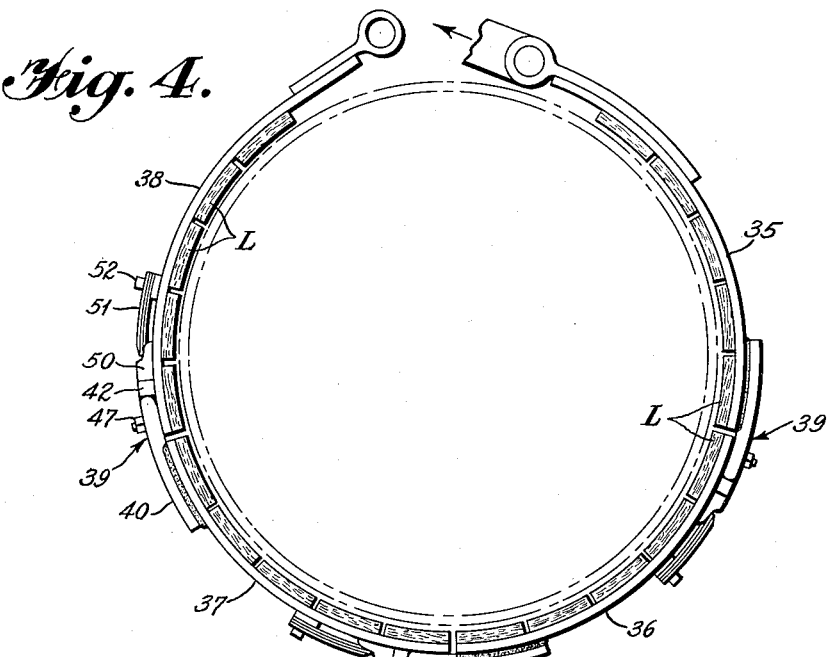
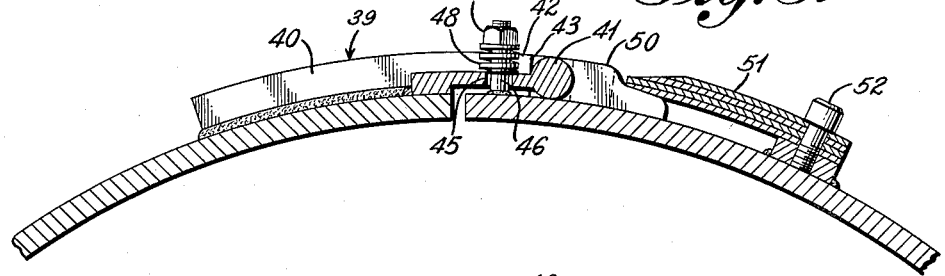
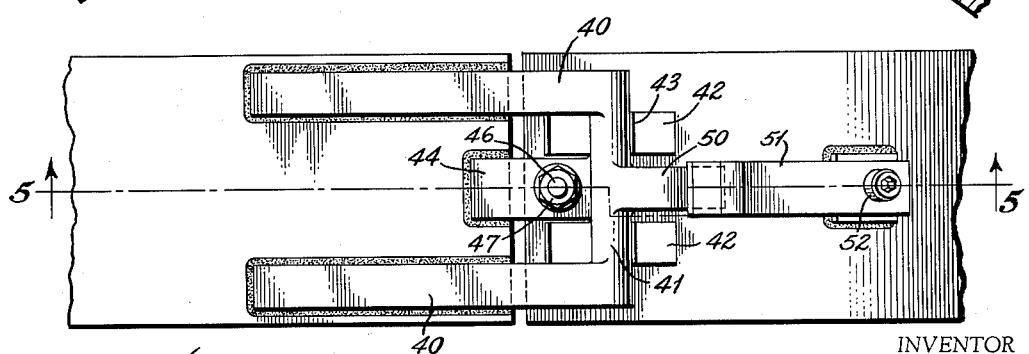
INVENTOR
David N. Goldberg
ATTORNEYS INVENTOR
David N. Goldberg
ATTORNEYS Nov. 8, 1955  D. N. GOLDBERG  2,723,016
BRAKE OR CLUTCH STRUCTURE
Filed Aug. 20, 1954  5 Sheets-Sheet 4
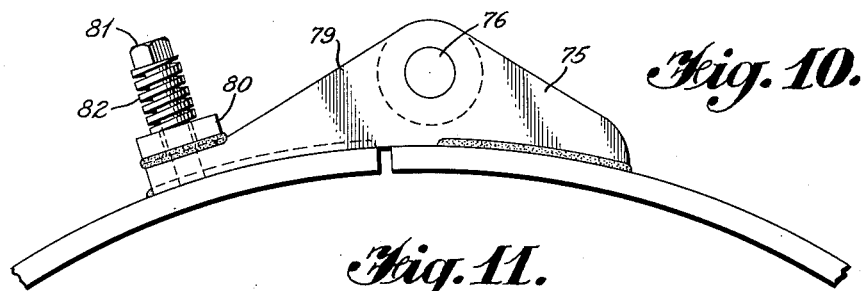
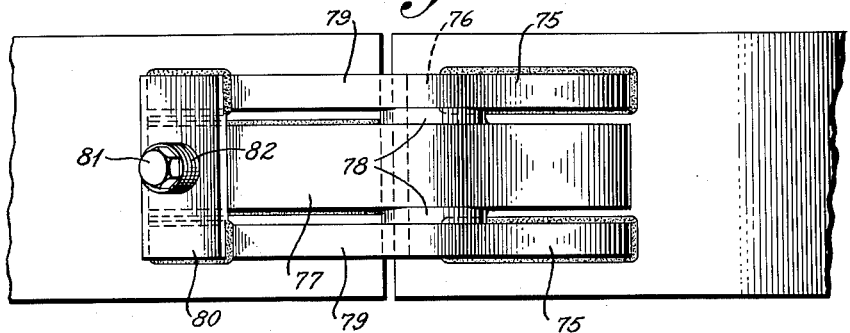
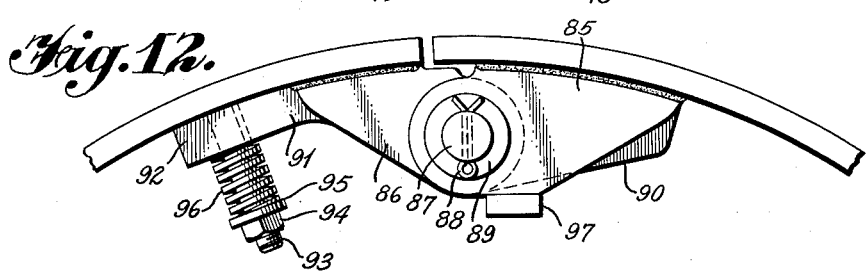
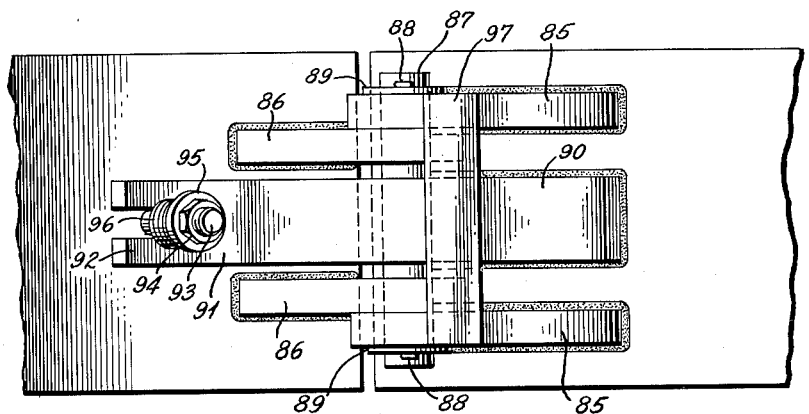
INVENTOR
David N. Goldberg
BY
ATTORNEYS Nov. 8, 1955 — D. N. GOLDBERG — 2,723,016

BRAKE OR CLUTCH STRUCTURE

Filed Aug. 20, 1954 — 5 Sheets-Sheet 5

INVENTOR
David N. Goldberg
BY
ATTORNEYS

United States Patent Office 2,723,016
Patented Nov. 8, 1955

2,723,016

BRAKE OR CLUTCH STRUCTURE

David N. Goldberg, Wheeling, W. Va.

Application August 20, 1954, Serial No. 451,096

13 Claims. (Cl. 192—107)

This invention relates generally to brake or clutch structures. More specifically the invention is directed to a brake or clutch assembly made up of separate shoe sections with the adjoining ends of said sections being pivotally interconnected and resiliently biased toward an arc noncoincidental with the arc of the drum braking surface with which the assembly is to be used.

In the development of friction lined brake and clutch band structures, repeated efforts have been made to achieve certain recognized theoretically perfect operating conditions. Briefly stated, these conditions are, first, that all of the friction lining material engage the drum in the stopping operation to insure uniform wearing of the lining and alleviate hot spots being produced due to lack of uniformity in the engagement of the lining with the drum. Secondly, it is desirable that upon movement of the lining material into engagement with the drum, the lining engage the drum at all points along its length with a uniform pressure. With the lining evenly engaging the drum and pressing thereagainst with a uniform force along its length, the braking or clutching action is more efficiently performed with cooler operation of the mechanism, less force required to perform the intended stopping operation and increased life of the friction lining material and drum. Further, the accomplishment of these desired conditions minimizes vibration of the mechanism which would be accentuated by lack of uniformity in the surface engagement and pressure of engagement of the friction material with the drum.

It is a principal object of this invention to provide a sectional brake or clutch assembly engageable with a drum braking surface which upon brake or clutch actuation, presents to the braking surface of the drum the maximum area of brake lining material on the assembly to insure cooler operation of the structure and the minimum of vibration which is developed in present structures due to localized or partial engagement of the lining material with the drum braking surface.

It is a further object of this invention to provide a sectional articulated brake or clutch assembly for use with a drum providing a braking surface which, by reason of the assembly's brake lining material uniformly and completely engaging the drum braking surface, requires a minimum of force application by the operator to effect the braking or clutching action and also insures increased life of the brake lining material in use.

Generally, the structure of the present invention which is effective to enable realization of the above objects consists of a brake or clutch assembly adaptable for use with either internal or external drums wherein the assembly embodies a plurality of arcuate shoe sections pivotally interconnected at their adjoining ends, resilient biasing means carried by the shoe sections and a lever arm coupled to the adjoining ends generally parallel to said sections with one end thereof being engaged by said biasing means to continuously urge said shoe sections toward an arc relationship such as to be noncoincidental with the arc of the drum braking surface.

As a specific feature embodied in the structure of this invention as generally outlined above, stop means are incorporated into the pivotal interconnection between the arcuate shoe sections to limit the relative pivoting of the interconnected sections to a predetermined arc which is noncoincidental with the arc of the drum braking surface with which the assembly is to be utilized.

In the preferred structure of the present invention, it is desirable that the transverse pivoting axis between adjacent shoe sections be offset relative to the junction of the adjoining ends of the interconnected shoe sections, in a direction spaced along the arcuate center line of the interconnected sections. This lateral offset of the interconnecting pivot axis from the radius of the shoe arc which intersects the junction of the shoe section ends, desirably provides a multiplication of the force exerted on the live end of the assembly in operation of the structure to more effectively urge the lining material carried by the shoe sections into complete and uniform engagement with the drum braking surface to the end of accomplishing the above set forth specific objects.

With the above noted objects in view and other objects of the invention which will become apparent from the detailed description of the illustrated structural embodiments of the instant invention as described hereinafter, reference will now be had to the drawings which illustrate, by way of example, several preferred embodiments of the instant invention.

In the drawings:

Figure 4 is a side elevation of a modified form of brake or clutch assembly as applied to an external drum structure.

Figure 5 is a detailed sectional view taken on line 5—5 of Figure 6.

Figure 6 is a plan view of the shoe section interconnection means as shown on Figure 4.

Figure 10 is a side elevation of a further modified shoe section interconnecting means.

Figure 11 is a plan view of the shoe section interconnection means of Figure 10.

Figure 12 is a side elevation of another modified shoe section interconnection means.

Figure 13 is a plan view of the interconnection means shown in Figure 12.

Figure 1:
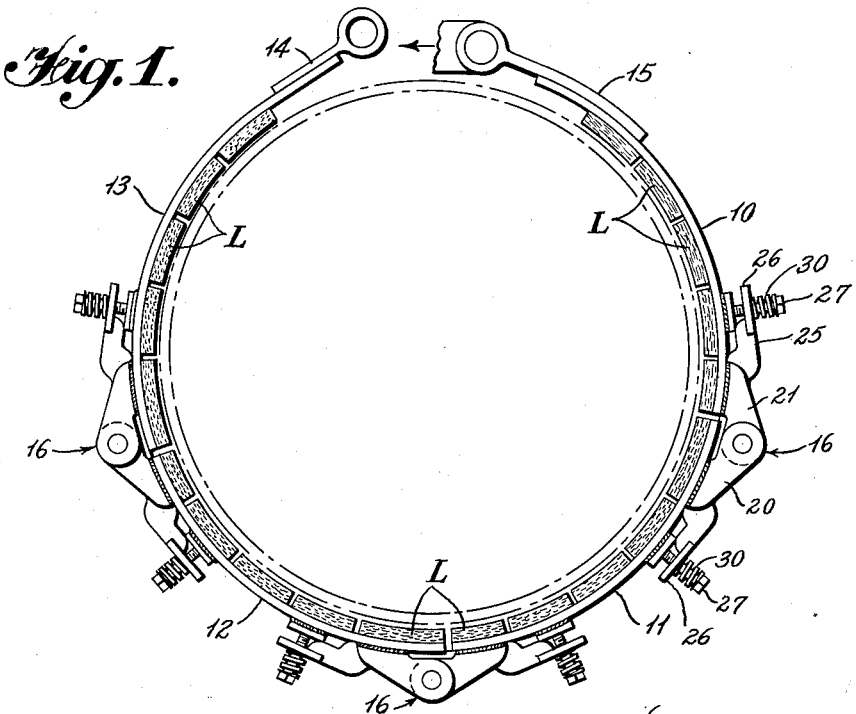
Figure 1 is a side elevation of a brake or clutch assembly embodying the instant invention as applied to an external brake drum structure.
Figure 2:
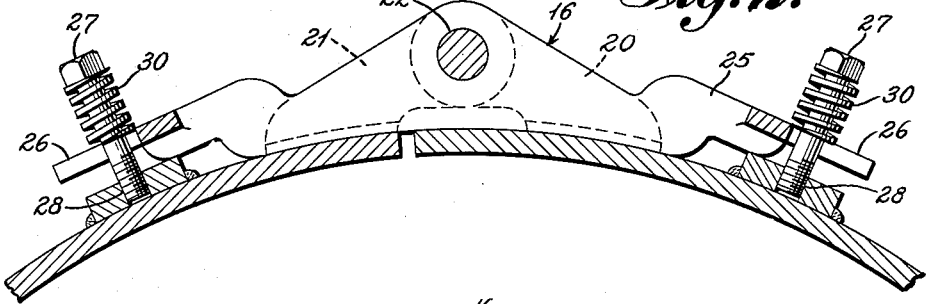
Figure 2 is a detailed sectional view taken on line 2—2 of Figure 3 of the shoe section interconnecting means employed in the structure of Figure 1.
Figure 3:
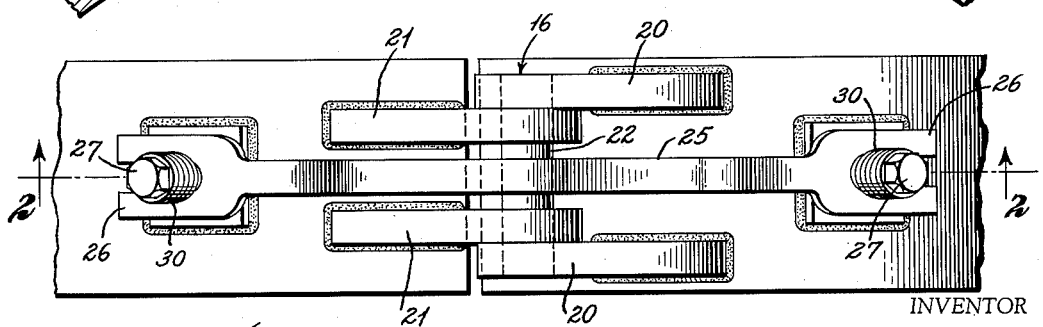
Figure 3 is a plan view illustrating the shoe section interconnecting means of Figure 1.

Referring to the drawings and specifically to Figures 1 through 3, there is shown thereon a brake or clutch assembly embodying the features of the instant invention, with Figure 1 illustrating the mode of application of the invention to an external brake drum structure. The assembly, as illustrated, is made up of four separate arcuate shoe sections, 10, 11, 12 and 13, with brake lining material L secured on the inner surfaces of the separate shoe sections as by suitably riveting or bonding such lining material to the individual sections. The dead or stationary end 14 of the brake or clutch assembly is adapted to be secured to stationary anchoring means (not shown) carried by the machine on which the assembly is mounted and the live end 15 is designed to be coupled to the assembly actuating mechanism (not shown). Through this actuating mechanism the operating force is applied to the assembly to urge the lining material L, carried by the assembly, into engagement with the exterior surface of the drum of the brake or clutch structure.

The separate shoe sections 10, 11, 12 and 13 are interconnected at their adjoining ends by couplers 16. The details of the coupler 16, as shown in Figure 1 applied to the brake or clutch assembly to interconnect the adjoining ends of the respective shoe sections, are more clearly illustrated in Figures 2 and 3. These couplers serve to maintain the individual shoe sections in longitudinal alignment while permitting relative pivotal movement between adjacent sections to provide an articulated brake or clutch assembly which insures, upon brake application, uniform and complete engagement of the lining material L with substantially the entire periphery of the brake drum.

Coupler 16 consists of a pair of spaced parallel lugs 20 secured to the end of one shoe section, as by welding thereto, and a similar pair of spaced parallel lugs 21 secured as by welding to the end of the next adjacent shoe section. The ends of the lugs 20 and 21 extend outwardly beyond the respective ends of the shoe sections and are provided with aligned bores extending transversely therethrough which receive a pivot pin 22.

As shown more clearly in Figure 3, the lugs 21 are spaced in relation to the lugs 20 so that the outer faces of the former snugly fit between the inner opposed faces of the latter. Thus, with the shoe section ends positioned for interconnection, the sections are aligned longitudinally of one another and upon insertion of the pivot pin 22 through the bores formed in the outer portions of the lugs 20 and 21, the adjacent shoe sections are interconnected for free pivoting movement relative to one another.

A lever arm 25 is mounted on pin 22 intermediate the lugs 21 so that the axis of pin 22 functions as the fulcrum therefore. The opposite ends of lever arm 25 are bifurcated as shown at 26 to receive bolts 27 which are threaded into tapped holes 28 in the shoe sections. To resiliently bias the ends of lever arm 25 toward the outer surface of the respective adjoining shoe sections which they overlie, coil springs 30 are provided on the bolts 27. The compressive biasing force offered by these springs may be adjusted by threading the respective bolts 27 into or out of their tapped holes 28.

It will be readily understood that the lever arm 25 in the embodiment of Figures 1–3 may be described as floating in relation to the pivotally interconnected shoe sections. The coil springs 30 engaging the opposite ends of such arm bias the shoe sections to pivot relative to one another toward an arc which is larger than the arc of the periphery of the drum with which the assembly is to be employed.

The interaction of springs 30 and lever arm 25 with the pivotal interconnection of the shoe sections is an important feature of the instant invention. By this structural arrangement, the articulated assembly is continuously urged toward a circular arc which is noncoincidental with the arc of the drum with which the assembly is to be used. Springs 30 acting on the leverage arm 25 offer a stiffly resilient resistance to the assembly's departing from its free state arc under force applied to the assembly through an actuating mechanism. However, as the actuating mechanism urges the assembly toward drum engagement, each coupler yields with a definite predetermined resistance to permit the arcuate shoe sections to move into drum engagement. The adjustability of the biasing force in the illustrated embodiments, as provided by springs 30 and bolts 27 in the structure of Figures 1–3, enables ready adjustment of the assembly so that the arcuate shoe sections will properly move into drum engagement upon actuation of the assembly. This controlled movement of the individual shoe sections in the brake or clutch assembly of the instant invention, as embodied in the hereinabove described embodiment as well as the embodiments described hereinafter, results in decidedly improved braking action over the resilient brake band extensively used in presently manufactured cranes, shovels, and other heavy machinery.

In the embodiment of Figures 1 through 3, the underside of lever arm 25 also functions as a stop means to limit the pivotal movement of the shoe sections to a maximum predetermined arc. Thus, under the biasing force of springs 30, the shoe sections pivot relative to one another until the outer surface of the respective shoes contact the underside of the lever arm 25. Thereafter further pivotal movement of the shoe sections to a larger arc is precluded by the lever arm 25.

In Figures 4, 5 and 6, there is illustrated a modified form of shoe section coupler which embraces the novel features of the instant invention. Figure 4 illustrates the mode of application of such coupler to an external brake or clutch assembly similar to the application illustrated in Figure 1. In this illustration there are shown four shoe sections, 35, 36, 37 and 38, with the free end of section 38 adapted to be secured to the stationary anchor on the machine to function as the dead end of the assembly and the free end of section 35 adapted to be coupled to the brake actuating mechanism to enable force to be applied to the assembly for operation of the brake or clutch structure. The adjoining ends of adjacent shoe sections are interconnected by a coupler 39, the details of which are more clearly shown in Figures 5 and 6.

Coupler 39 consists of a generally U-shaped yoke with the legs 40 thereof secured, as by welding, to the end of one shoe section. The transverse portion of the yoke is generally cylindrical in cross section to serve as a pivot pin 41. The adjoining end of the next adjacent shoe section is provided with a pair of spaced parallel pin sockets 42 having transversely aligned notches 43 which receive the transverse pin 41.

Upon assembly of the coupler 39, the pin 41 is freely pivotal within the notches 43 provided in sockets 42. To retain the pin 41 in the aligned notches 43, a tab 44, integral with the pin 41, is provided extending generally parallel to the legs 40 with the outer end of such tab being secured to the shoe section to which the legs 40 are secured. Tab 44 is provided with an aperture 45 to receive a stud 46 which is carried by the end of the shoe section carrying sockets 42. A nut 47 and compression spring 48 are threaded onto the stud 46 to retain pin 41 within the notches 43. As illustrated in Figure 5, the relationship of the parts permits relative pivotal movement between the respective shoe sections about the axis of pin 41. At the same time, the use of threaded stud 46 and nut 47 permits ready disassembly of the pivotal interconnection between the shoe sections by removing such nut and spring 48 and lifting pin 41 out of the notches 43.

To bias the pivotally interconnected shoe sections toward an arc which is noncoincidental with the arc of the drum with which the assembly is to be used, a lever arm 50 extends outwardly of the pin 41 with the outer end thereof engaged beneath a leaf spring 51. This spring is secured to the shoe section carrying sockets 42 by cap screw 52 threaded into such shoe section. In operation, the spring 51 continuously biases the outer end of lever arm 50 toward the surface of the shoe section which carries such spring. Since the arm 50 is integral with pin 41, the biasing action causes the adjacent shoe sections to pivot about the axis of pin 41 and assume an arm relationship which is non-coincidental with the arc of the drum with which the assembly is to be used. Although a leaf spring has been illustrated in the embodiment of Figures 4 through 6, it will be readily recognized that within the scope of the instant invention other forms of springs may be employed to provide the biasing force.

The underside of lever arm 50 functions as a stop to limit the maximum arc to which the interconnected shoe sections can move.

Particular attention is called to the fact that in the instant invention as exemplified by the illustrated embodiments herein described, the pivotal axis between adjacent shoe sections is offset laterally relative to the junction of the section ends. This displacement of the pivoting axis has been found to be particularly advantageous in articulated clutch or brake assemblies of the instant invention in that it gives a leverage action as brake actuating force is applied to the assembly. This leverage action serves to more effectively force the lining material into a uniform and complete engagement with the braking surface of the drum. Thus, as the brake operating force is applied, the offset pivot axis creates a tendency to pry the ends of the shoe sections into firm engagement with the drum braking surface and thereby insure that as the lining material engages such surface the load will be progressively distributed from one shoe section to the next, resulting in uniform and complete lining engagement. However, in structures where this leverage action is not desired or not needed, the pivot axis may be centered directly above the junction of the abutting ends of adjacent shoe sections.

It is to be understood that the shoe section interconnecting couplers of the embodiments of Figures 1 through 6 are equally effective whether applied to external or internal brake or clutch applications. Specific illustration of applications of those two embodiments to internal brake or clutch structures is considered unnecessary since the basic characteristics are adequately illustrated by the figures showing the couplers on external brake or clutch assemblies and essentially the differences in the types of application depend basically on the direction of curvature of the shoe sections in relation to the couplers.

Figure 7:
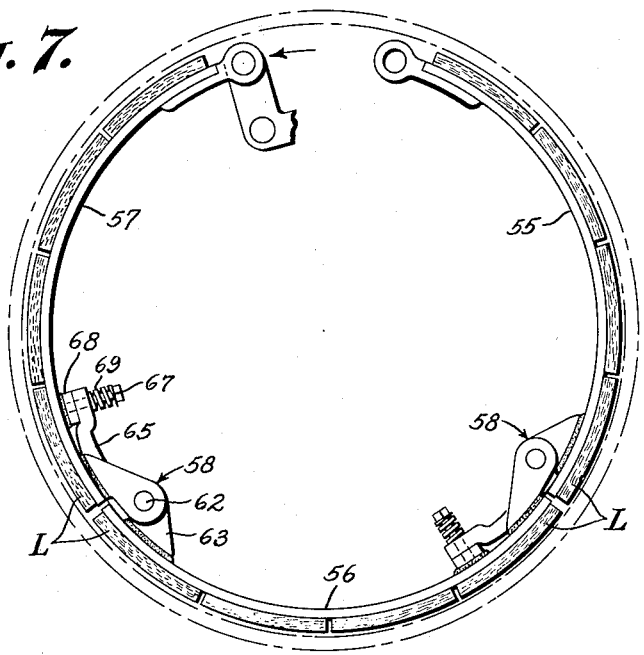
Figure 7 is a side elevation of a further modified brake or clutch assembly for application to an internal drum structure.
Figure 8:
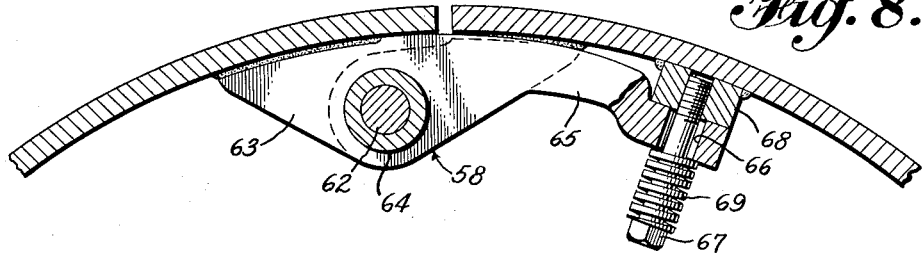
Figure 8 is a detailed sectional view taken on line 8—8 of Figure 9.
Figure 9:
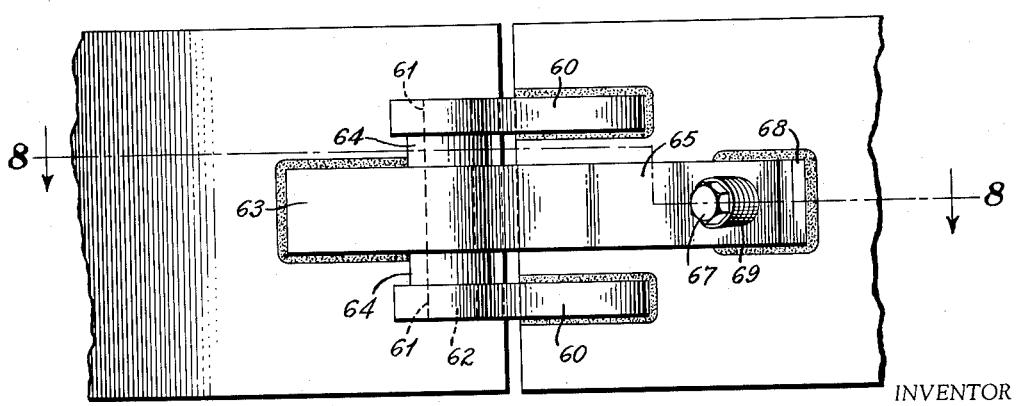
Figure 9 is a plan view of the shoe section interconnecting means as shown in Figure 7.

Figures 7 through 9 illustrate a further modification of the instant invention with the brake or clutch assembly being shown as applied to an internal brake drum structure. In Figure 7, for purposes of illustration, there are three shoe sections, 55, 56 and 57, pivotally interconnected to form the assembly with the free end of section 55 being adapted to be connected to the stationary anchor on the structure to form the dead end of the assembly and the free end of section 57 coupled to the brake actuating lever to enable imparting force to the assembly to urge the lining L carried by the respective shoe sections into engagement with the braking surface of the drum.

The interconnection between the respective shoe sections in the embodiment of Figures 7, 8 and 9 is provided by coupler 58, the details of which are more clearly shown in Figures 8 and 9. The coupler is made up of a pair of spaced parallel lugs 60, welded to the end of one shoe section and extending outwardly beyond the end of such section with a pair of transversely aligned bores 61 formed in the outer end of these lugs. A pivot pin 62 extends through the aligned bores 61 and pivotally receives intermediate the lugs 60, an apertured lug 63 which is secured as by welding to the end of the next adjacent shoe section. Thus pin 62 serves to pivotally interconnect the adjacent shoe sections by means of the lugs 60 and 63 respectively carried by such sections. To maintain the shoe sections in proper alignment, spacing sleeves 64 are disposed on pin 62 on either side of lug 63 to maintain such lug centered between the parallel lugs 60. Although spacing sleeves have been illustrated on the drawing, it will be readily understod that if desired, annular bosses may be formed on either the opposite faces of lugs 60, or on the sides of lug 63, which bosses will function similarly to sleeves 64 to maintain the lug 63 centered between lugs 60.

Integral with the outer end of lug 63 and extending outwardly therefrom to overlie the surface of the adjacent shoe section end, there is provided a lever arm 65. This arm is apertured at 66 at its outer end and receives therethrough a bolt 67 threaded into a boss 68 on the shoe section. A coil spring 69 surrounds the bolt 67 and is compressed between the head of such bolt and the outer surface of the end of arm 65. Thus, spring 69 continuously biases the lever arm 65 toward engagement with the shoe section and by reason of such arm being integral with the lug 63, the two shoe sections are biased toward an arc of curvature smaller than the curvature of the internal braking surface of the drum with which the assembly is to be employed. As in the previously described embodiments, the lever arm and resilient biasing means insures firm and stable operation of the braking or clutching device upon the application of actuating force to the assembly. The pivotal interconnection between the individual shoe sections permits the sections to move outwardly to engage the drum braking surface against the stiffly resilient resistance offered by the compression spring 69 acting on the outer end of lever arm 65.

To limit the relative pivotal movement between the interconnected shoe sections and thereby determine the minimum arc which may be assumed by the shoe sections in the absence of an actuating force applied to the assembly, the underside of lever arm 65 contacts the boss 68 and thus precludes further pivotal movement of the shoe sections to a smaller arc. The action of this limit stop is substantially identical to the action occurring in the previously described embodiments and, as is characteristic of such previous embodiments, contributes to the effective braking or clutching action in operation of the device so that the individual shoe sections will evenly engage with the drum braking surface upon actuation to effect the stopping action.

Figures 10 and 11 show another pivotal coupling for interconnecting individual clutch or brake shoe sections, the coupler being illustrated in a form employed for external brake or clutch structures. In this modification a pair of spaced parallel lugs 75 are welded to the end of one shoe section and provided with transversely aligned bores to receive a pivot pin 76 therein. The end of the adjacent shoe section has secured thereto a lug 77 which is apertured to pivotally engage with the pin 76 to thus pivotally interconnect the shoe sections.

Lug 77 is provided adjacent the pin receiving aperture with annular bosses 78 which serve to center lug 77 intermediate the lugs 75 and thus align the shoe sections when they are connected together. Lugs 75 have lever arms 79 extending outwardly therefrom to overlie, in the connected relation of the shoe sections, the surface of the opposite shoe section.

The outer ends of the lever arms 79 carry a bridging plate 80 which is centrally apertured to receive a bolt 81 threaded into a tapped hole in the end of lug 77. A compression coil spring 82 surrounds the bolt 81 and is compressed between its head and the bridging plate 80 so as to bias the bridging plate and thus the lever arms 79 toward the surface of the shoe section which they overlie.

Similarly to the hereinabove described embodiments, the spring 82 biases the outer free ends of lever arms 79 so as to urge the pivotally interconnected shoe sections toward a maximum arc which is noncoincidental with the drum braking surface arc. To limit the extent of pivoting between the shoe sections, the underside of the two lever arms 79 is so contoured as to fit the curvature of the upper surface of the shoe section which they overlie. Thus, in the free state, spring 82 urges the lever arms and shoe section end which they overlie into contact with each other. Upon contact between these two elements, further pivoting movement between the two shoe sections is prevented.

Figures 12 and 13 illustrate a form of shoe section coupler somewhat similar to that of Figures 8 and 9 but modified to incorporate certain additional advantageous features over the structure of Figures 8 and 9. Thus, a pair of spaced parallel lugs 85 are secured to one shoe section end and a pair of spaced parallel lugs 86 welded to the adjoining end of the next adjacent shoe section. The lugs 86 are spaced relative to the lugs 85 so that upon moving the shoe sections together for interconnection, the outer faces of the former will be snugly received between the inner opposite faces of the latter to maintain shoe section alignment. The outer ends of the lugs 85 and 86 are provided with transversely aligned bores through which is inserted a pivot pin 87. As illustrated, the pin is retained in position by cotter pins 88 extending through apertures in the pin ends and washers 89 provided between the respective cotter pins and the outer faces of lugs 85.

An additional lug 90 is welded to the shoe section intermediate lugs 85 and pivotally engages the pin 87. Extending beyond the pin 87 on the side thereof opposite lug 90, there is provided a lever arm 91 having a bifurcated end 92 which receives a stud 93, with the stud carried by the shoe section which the lever arm 91 overlies. A nut 94 and washer 95 are threaded onto stud 93 to compress a spring 96 between the bifurcated end 92 of arm 91 and washer 95. The action of the structure of the embodiment of Figures 12 and 13, as described above, is identical to the operation of the embodiment shown in Figures 8 and 9 with spring 96 urging the shoe sections toward a minimum arc noncoincidental with the brake drum arc and the underside of lever arm 91 serving to limit the minimum arc obtainable between the pivotally interconnected shoe sections in their free state.

To provide two-way limiting of the pivotal movement between the shoe sections, an arc limiting plate 97 is secured across the lugs 85 and the ends of lugs 86 formed so that as the two shoe sections are pivoted toward a greater arc or toward drum engagement, a point will be reached when the ends of lugs 86 contact the underside of plate 97 and thereafter preclude further pivoting movement of the two interconnected shoe sections. With this structure for pivotally interconnecting shoe sections, not only is the minimum arc determined by the relationship of the elements but also the maximum arc for angular relationship between two interconnected arcuate shoe sections is limited.

Figure 14:
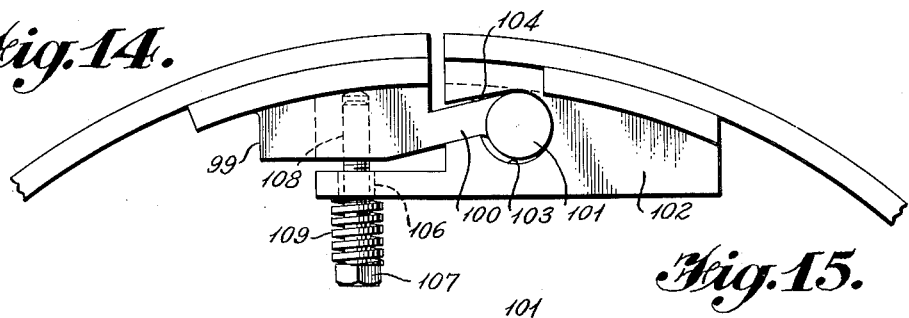
Figure 14 is a side elevation of a further embodiment for pivotal interconnection of shoe sections.
Figure 15:
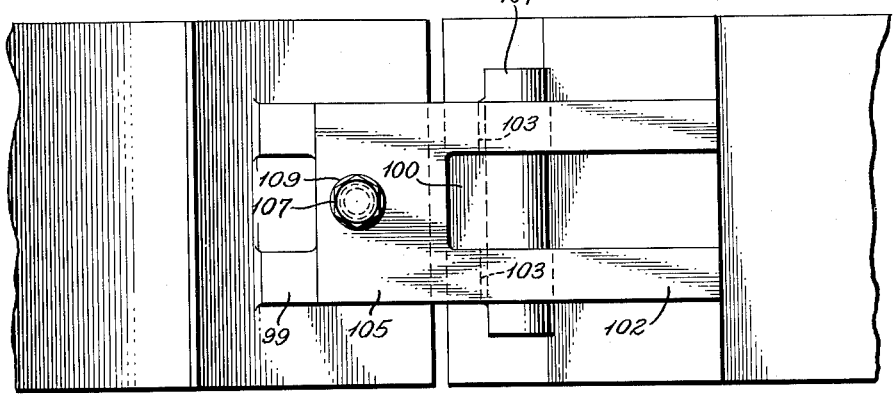
Figure 15 is a plan view of the pivotal interconnection embodiment of Figure 14.

A further modification employing two-way arc limiting in a pivotal coupling between shoe sections is illustrated in Figures 14 and 15. This modification is shown in the form applicable to internal brake or clutch structures. However, it will be appreciated that within the scope of the instant invention, this modification as well as the modifications shown in Figures 7, 8, 9, 12 and 13 may be simply adapted for external brake or clutch structures.

The coupling of Figures 14 and 15 consists of a member 99 secured to the end of one shoe section and having a pivot pin 101 carried by a web portion 100 extending outwardly beyond the end of such shoe section. For reasons explained more fully hereinafter, web portion 100 is disposed diagonally of a radius intersecting the junction of the interconnected shoe section ends and as illustrated the pin 101 is offset radially inwardly of the end of web portion 100. The adjoining end of the adjacent shoe section has secured thereto a socket 102 having a transverse semicylindrical pocket 103 formed therein of a slightly larger diameter than the diameter of the outer curvature of pin 101 to provide a loose fit of the pin in the pocket. A flared slot 104 leads from the pocket 103 outwardly toward the end of the shoe section. In assembling the two shoe sections for pivotal interconnection, the pin 101 is slid laterally into the pocket 103 or, in other words, the two shoe section ends are moved transversely of one another to position pin 101 within semicylindrical pocket 103. As so assembled, the web portion 100, which carries pin 101, lies within the flared slot 104.

The outer surface of the flared slot 104 takes the form of a lever arm 105 which extends outwardly to overlie the member 99 when the two shoe sections are interconnected. Lever arm 105 is apertured at 106 to receive a bolt 107 threaded into a tapped hole 108 in member 99. A spring 109 surrounds the shank of bolt 107 and is compressed between the upper surface of arm 105 and the head of such bolt. Thus spring 109, in the instant embodiment, biases the arm 105 toward contact with the upper surface of member 99 so that the two shoe sections will be moved toward a minimum arc. The undersurface of arm 105, which forms one side of flared slot 104, serves as a stop to limit the extent of pivotal movement between the shoe sections when it contacts the outer surface of the web portion 100 which carries pin 101. Upon reverse or opposite pivotal movement of the shoe sections, the extent of such opposite pivoting is limited by the other side of slot 104 engaging the underside of web portion 100.

Referring further to the diagonal or tilted relation of the web portion 100 to the other parts of the coupling of Figures 14 and 15, it is noted that the member 99 which carries web portion 100 and pin 101 is mounted on the shoe section toward the live end or actuated end of the clutch or brake assembly. By tilting or diagonally disposing the web portion 100 relative to a radius extending from the center of the brake or clutch assembly arc between the adjoining ends of the interconnected shoe sections, a directing of the forces is obtained which improves the operating characteristics of the assembly. Thus, as the actuating force is applied through the shoe section carrying member 99, such force is transmitted through web portion 100 and pin 101 which is pivotally received in socket 102. The tilting of the web portion 100 imparts a radial force component to more effectively urge the shoe section portion which carries socket 102 into drum engagement, as well as transmitting a circumferential force component which is effective in urging the succeeding increments of the shoe section length into drum engagement. As assembly actuating force is applied through diagonally positioned web portion 100, the radial force component or vector of the applied force tends to offset any tendency of the end of the shoe section to twist or bend away from the drum surface instead of moving outwardly into drum engagement. The loose fit of pin 101 within oversized pocket 103 has been found to be a contributing factor toward insuring uniform brake lining engagement with the drum and thus results in more effective transmission of the desired forces from web 100 into the socket 102 carried by the adjoining shoe section.

As shown on the drawing, the pin 101 is offset radially inwardly of the end portion of web 100. This relation of the pin to the web portion has been found to be preferred. However, under some circumstances, if desired, the pivot pin may be centered relative to the axis of web portion 100 or offset radially outwardly relative to the axis of web portion 100.

Figure 16:
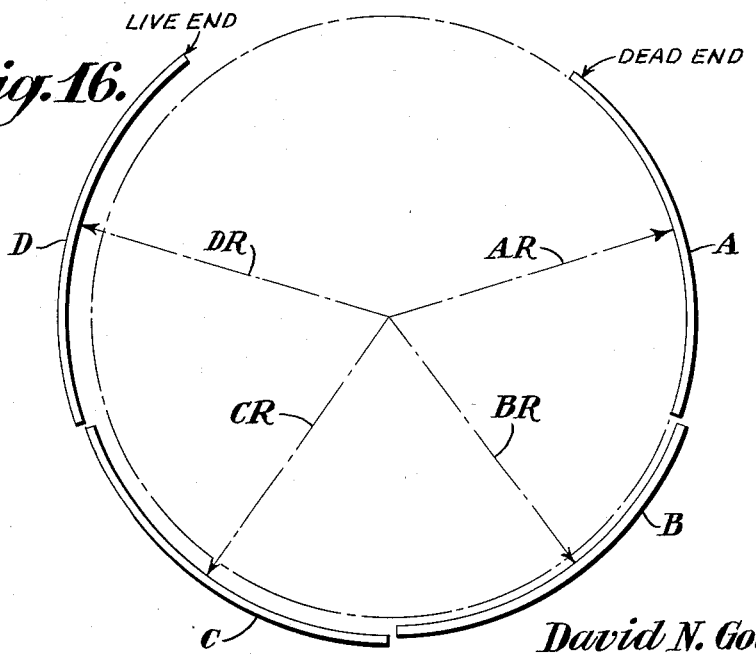
Figure 16 is a diagrammatic view illustrating, in exaggerated form, the preferred arc characteristics of the interconnected shoe sections as embodied in this invention.

Figure 16 offers a diagrammatic view, in exaggerated form, of the arc relationship of the individual shoe sections employed in the brake or clutch assembly of the instant invention. As pointed out hereinabove, for most effective brake operation it is desired that the lining material uniformly and completely engage the drum braking surface during a stopping operation. The articulated or segmental brake assembly of the instant invention promotes the accomplishment of this desired result. As a further means of insuring uniform and complete engagement of the lining material with the braking surface, the individual arc curvatures for the shoe sections interconnected in a particular assembly are specifically selected to effect improved shoe section engagement with the braking surface.

Thus, as shown in Figure 16, four separate shoe sections, A, B, C and D, are shown by way of example to illustrate their respective arc relationships for assembly into a particular brake or clutch unit structure. If it be assumed that the drum diameter with which the assembly is to be used is 24 inches, then the radius of curvature AR for the shoe segment A nearest the dead end of the assembly would be 12 inches or equal to the radius of the drum braking surface. The next shoe section B pivotally connected to section A would be curved to an arc radius BR of 12⅛ inches. The third shoe section C pivotally connected to section B would be formed with an arc radius CR of 12¼ inches and the fourth shoe section D coupled to section C would be curved to an arc radius DR of 12⅜ inches. This fourth shoe section D is the live end of the assembly and thus is connected to the actuating mechanism. By reason of the progressively increasing arc radii of the shoe sections, upon application of a brake or clutch operating force, the shoe sections A, B, C and D will successively engage the drum braking surface and through the action of the hereinabove described pivotal interconnecting means, transfer the braking force from one shoe to the next to the end that as the actuating force is applied it will result in even distribution of pressure throughout the area of the brake lining material for uniform and smooth brake operation.

In the various embodiments of the instant invention as illustrated on the drawings and hereinabove described, the pivotal axis of the couplers, which interconnect the separate arcuate shoe sections in each brake or clutch assembly, is displaced or offset laterally relative to the junction between the abutting ends of interconnected shoe sections. As discussed above, this offset of the pivot axis contributes definite advantages to the action of the assembly as the brake actuating force is applied and thus is a contributing factor in the structure toward securing complete and uniform engagement of the brake lining material with the braking surface of the drum.

It has also been noted that in certain instances it may be found that pivot axis offset is not absolutely necessary. Accordingly in these instances, such axis may be centered above the junction between abutting ends of adjacent interconnected shoe sections.

As a further contributing factor to the highly improved braking or clutching action attributable to the instant invention in operation, it is generally considered desirable that any offset of the pivot axis be made in a direction which will dispose such pivot axis nearer the point of maximum force application. Generally the point of maximum force application is the stationary or dead end of the assembly so that in such case the pivot axis would be moved toward the dead end of the brake or clutch assembly. However, in some structures, special means are provided to insure maximum pressure being applied at the live end of the brake band. Where such special means are provided in the brake or clutch structure, the friction unit assembly of the instant invention to be used therewith will be constructed with the pivot axis being moved toward the live end of the assembly.

The present application is a continuation-in-part of my copending application entitled, "Variable Arc Braking Device," filed January 26, 1954, Serial No. 406,104.

I claim:

1. In a brake or clutch structure employing a drum and a friction unit assembly adapted to be selectively engageable with the drum, said friction unit assembly comprising a plurality of arcuate shoe sections, means carried by the adjoining ends of the adjacent shoe sections for pivotally interconnecting said shoe sections in longitudinal alignment, a lever arm having its fulcrum at the axis of the pivotal interconnection and extending outwardly therefrom to overlie the end portion of one of said adjacent shoe sections, resilient biasing means carried by said one shoe section and engaging the overlying end of said arm to urge it toward said one shoe section, and means for restraining the opposite end of said lever arm for movement with the other of said adjacent shoe sections.

2. In a brake or clutch structure as recited in claim 1 wherein said last named means comprises resilient biasing means carried by the other of said adjacent shoe sections and engaging the opposite end of said lever arm to urge it toward the surface of the other of said shoe sections.

3. In a brake or clutch structure as recited in claim 1 wherein said last named means comprises a rigid connection of the opposite end of said lever arm for movement with the other of said shoe sections.

4. In a brake or clutch structure as recited in claim 1 wherein the radius of curvature of the pivotally interconnected arcuate shoe sections is successively larger for the individual shoe sections proceeding from one end of the assembly to the other.

5. In a brake or clutch structure employing a drum and a friction unit assembly adapted to be selectively engageable with said drum, said friction unit assembly comprising a plurality of arcuate shoe sections, means carried by the adjoining ends of adjacent shoe sections for pivotally interconnecting said shoe sections in longitudinal alignment, a lever arm fulcrumed for movement about the axis of the pivotal interconnection and extending outwardly therefrom to overlie the end portion of one of said adjacent shoe sections, the opposite end of said lever arm being restrained for movement with the other of said adjacent shoe sections, biasing means carried by said one shoe section and engaging the overlying end of said arm to urge it toward said one shoe section, and stop means on said lever for limiting relative pivotal movement of said shoe sections.

6. In a brake or clutch structure employing a drum and a friction unit assembly selectively engageable with said drum, said friction unit assembly comprising a plurality of arcuate shoe sections, means pivotally interconnecting the adjoining ends of adjacent shoe sections in longitudinal alignment, said means including a pivot pin carrying member secured to the end of one shoe section, a pin receiving bearing carried by the adjoining end of the next adjacent shoe section, a pivot pin coupling said member and said bearing, a lever arm fulcrumed at the axis of said pivot pin and extending outwardly therefrom to overlie the end portion of one shoe section, the opposite end of said arm being restrained for movement with the other of said adjacent shoe sections, and spring biasing means carried by said one shoe section and engaging said lever arm to bias said arm toward said one shoe section.

7. In a brake or clutch structure as recited in claim 6 wherein the axis of said pivot pin disposed transversely of said shoe sections is offset laterally relative to the junction of the abutting ends of the pivotally interconnected shoe sections.

8. In a brake or clutch structure as recited in claim 6 wherein the spring biasing means is adjustable to facilitate varying the biasing force applied to said lever arm.

9. In a brake or clutch structure employing a drum and a friction unit assembly selectively engageable with said drum, said friction unit assembly comprising a plurality of arcuate shoe sections, a first pair of spaced parallel lugs secured to the end of one shoe section, a second pair of spaced parallel lugs secured to the adjoining end of the next adjacent shoe section, said pairs of lugs having transversely aligned bores in the outer ends thereof, a pivot pin positioned in said bores to pivotally interconnect the shoe sections, a lever arm fulcrumed at said pivot pin with the opposite ends thereof overlying the end portions of the adjacent shoe sections, a spring engaging each end of said lever arm, and means carried by the end portions of adjacent shoe sections and cooperating with each spring for adjusting the force applied thereby to urge the respective lever arm ends toward the end portion of the shoe section which it overlies.

10. In a brake or clutch structure employing a drum and a friction unit assembly selectively engageable with said drum, said friction unit comprising a plurality of arcuate shoe sections, a yoke member having a pivot pin and parallel legs secured to the end of one shoe section, a pair of notched pin receiving sockets secured in spaced parallel relation on the adjoining end of the next adjacent shoe section, a lever arm extending outwardly from one side of said pivot pin, said adjoining end of the next adjacent shoe section having spring means secured thereto engaging the outer end of said lever arm to urge it toward said next adjacent shoe section, and means for retaining said pivot pin in said pin receiving sockets while permitting relative pivotal movement between said shoe sections.

11. In a brake or clutch structure including a drum and a friction unit assembly selectively engageable with said drum, said friction unit assembly comprising a plurality of arcuate shoe sections, a first pair of spaced parallel lugs secured to the end of one shoe section, a second pair of spaced parallel lugs secured to the adjoining end of the next adjacent shoe section, said pairs of lugs having transversely aligned bores, a pivot pin positioned in said bores to pivotally interconnect said shoe sections, a lever arm carried by said one shoe section and fulcrumed at the axis of said pivot pin with the outer end thereof overlying the end portion of the next adjacent shoe section, spring means carried by said end portion engageable with said outer end of said lever arm to urge said arm toward engagement with said next adjacent shoe section, and an arc limiting plate secured between said first pair of spaced parallel lugs to be engaged by the outer ends of said second pair of lugs to limit relative pivotal movement between said shoe sections.

12. In a brake or clutch structure including a drum and a friction unit assembly selectively engageable with said drum, said friction unit assembly comprising a plurality of arcuate shoe sections, a connecting member secured to the end of one shoe section having a web portion carrying a pivot pin at the outer end thereof, a socket member secured to the adjoining end of the next adjacent shoe section and having a semicylindrical pocket formed therein, said socket member having a tapered slot communicating with said pocket and opening outwardly therefrom, said pivot pin being received in said pocket to pivotally interconnect said shoe sections, a lever arm carried by one of said members and extending outwardly therefrom to a position overlying the other of said members, and spring biasing means carried by said other of said members for urging said lever arm toward said other member.

13. In a brake or clutch structure as recited in claim 12 wherein said web portion on said connecting member is disposed diagonally relative to the tangent to the end of the arc of said one shoe section.

References Cited in the file of this patent

UNITED STATES PATENTS

| | | |
|---|---|---|
| 1,529,087 | Reynolds | Mar. 10, 1925 |
| 1,894,036 | Gunn | Jan. 10, 1933 |
| 1,917,184 | Sneed | July 4, 1933 |
| 2,046,306 | Fykse | June 30, 1936 |